(12) United States Patent
Smith

(10) Patent No.: US 8,281,135 B2
(45) Date of Patent: *Oct. 2, 2012

(54) ENFORCING USE OF CHIPSET KEY MANAGEMENT SERVICES FOR ENCRYPTED STORAGE DEVICES

(75) Inventor: Ned Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/324,032

(22) Filed: Dec. 13, 2011

(65) Prior Publication Data

US 2012/0084555 A1 Apr. 5, 2012

Related U.S. Application Data

(63) Continuation of application No. 12/319,210, filed on Dec. 31, 2008, now Pat. No. 8,103,883.

(51) Int. Cl.
*H04L 9/32* (2006.01)
*H04L 29/06* (2006.01)
*H04L 9/00* (2006.01)
*H04L 9/08* (2006.01)
*G06F 11/30* (2006.01)
*G06F 17/30* (2006.01)
*G06F 7/04* (2006.01)
*H04N 7/167* (2011.01)
*H04K 1/00* (2006.01)

(52) U.S. Cl. ........ 713/171; 713/164; 713/172; 713/193; 726/2; 726/21; 380/44; 380/45; 380/228; 380/273; 380/278

(58) Field of Classification Search ................ 713/164, 713/171, 172, 193; 726/2, 21; 380/44, 45, 380/228, 273, 278

See application file for complete search history.

(56) References Cited

U.S. PATENT DOCUMENTS

| 5,623,546 | A | 4/1997 | Hardy et al. |
| 6,249,866 | B1 | 6/2001 | Brundrett et al. |
| 2003/0204732 | A1 | 10/2003 | Audebert et al. |
| 2004/0146164 | A1 | 7/2004 | Jonas et al. |
| 2006/0062383 | A1 | 3/2006 | Kaneda et al. |
| 2008/0109615 | A1 | 5/2008 | Morishita et al. |

(Continued)

FOREIGN PATENT DOCUMENTS

JP 2006091952 A 4/2006

(Continued)

OTHER PUBLICATIONS

European Search Report for European Patent Application No. 009252907.2, mailed on Aug. 19, 2010, 5 pages.

(Continued)

*Primary Examiner* — Mohammad W Reza
(74) *Attorney, Agent, or Firm* — Barnes & Thornburg, LLP; Glen M. Kellett

(57) ABSTRACT

A method, system, and computer-readable storage medium containing instructions for controlling access to data stored on a plurality of storage devices associated with a first platform. The method includes authenticating a user to access the first platform, wherein the first platform includes first and second storage devices, chipset encryption hardware, and a memory. Data stored on the storage devices are encrypted, with first data on the first storage device being encrypted by the chipset encryption hardware and second data stored on the second storage device being encrypted by another encryption mechanism. The data are decrypted and the user is allowed to access the first data and the second data.

20 Claims, 11 Drawing Sheets

U.S. PATENT DOCUMENTS

2008/0263368 A1   10/2008   Mikami et al.

FOREIGN PATENT DOCUMENTS

| JP | 2008117253 A | 5/2008 |
| JP | 2008269179 A | 11/2008 |
| WO | 9827685 A1 | 6/1998 |
| WO | 2005069105 A1 | 7/2005 |

OTHER PUBLICATIONS

Office Action for Japanese Patent Application No. 2009-293557, delivered Jul. 12, 2011, 2 pages of Office Action and 1 page of unofficial English summary translation.

Decision to Grant received for Japanese Patent App. No. 2011-261670, mailed May 22, 2012, 2 pages.

US 8,281,135 B2

ENFORCING USE OF CHIPSET KEY MANAGEMENT SERVICES FOR ENCRYPTED STORAGE DEVICES

CROSS-REFERENCE TO RELATED U.S. PATENT APPLICATION

This application is a continuation application of U.S. application Ser. No. 12/319,210 entitled "ENFORCING USE OF CHIPSET KEY MANAGEMENT SERVICES FOR ENCRYPTED STORAGE DEVICES," which was filed on Dec. 31, 2008.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to protection of data stored on computer systems.

BACKGROUND

Corporate data are increasingly mobile, distributed, and prolific. Data are routinely taken out of physically secured facilities to accommodate workers who travel or have flexible working habits. Data are also distributed geographically as corporations' business interests take them into other cities, states, and countries. Data are prolific in both the rate at which they are generated and in the multi-media formats in which they can be presented. All of these forces drive the evolution of new storage media, higher bandwidth subsystems, and network-connected storage that require that data be protected both while in transit and while at rest.

Data-at-rest (DAR) encryption technology prevents the unauthorized use of data stored on lost or stolen storage devices, thereby preventing these data from being spread on the Internet or other networks. DAR encryption acts as an automated and quick response mechanism to prevent the inevitable loss and theft of storage devices from becoming the loss and theft of the data stored on those devices.

One of the challenges of protecting data stored on various storage devices associated with a computing platform is that encryption technologies and key management strategies differ depending upon the entity performing the encryption. Storage hardware may have built-in encryption capabilities that are unique to the storage hardware vendor, thereby requiring use of the storage hardware vendor's tools to access the data. Software-based encryption requires different key generation and management services than hardware-based encryption and may therefore require use of the software vendor's tools to access the software-encrypted data. Planning for key recovery and migration of data in the event of theft or loss may therefore require use of a number of different vendors' tools to protect and/or recover all of the data associated with a computing platform.

DETAILED DESCRIPTION

Embodiments of the present invention may provide a method, apparatus, system, and computer program product for providing comprehensive protection of data stored on storage devices in a computing platform. Data are protected by authenticating users of the platform prior to allowing access to data stored on the storage devices. Furthermore, data are protected by securely managing all keys used to encrypt data stored on storage devices associated with the platform, including keys used by chipset hardware to encrypt storage devices as well as keys used by encryption software and/or by the storage device hardware. In addition, data are protected by providing theft deterrence mechanisms to prevent access to the stored data when a theft of the platform and/or storage device is detected.

Figure 1:
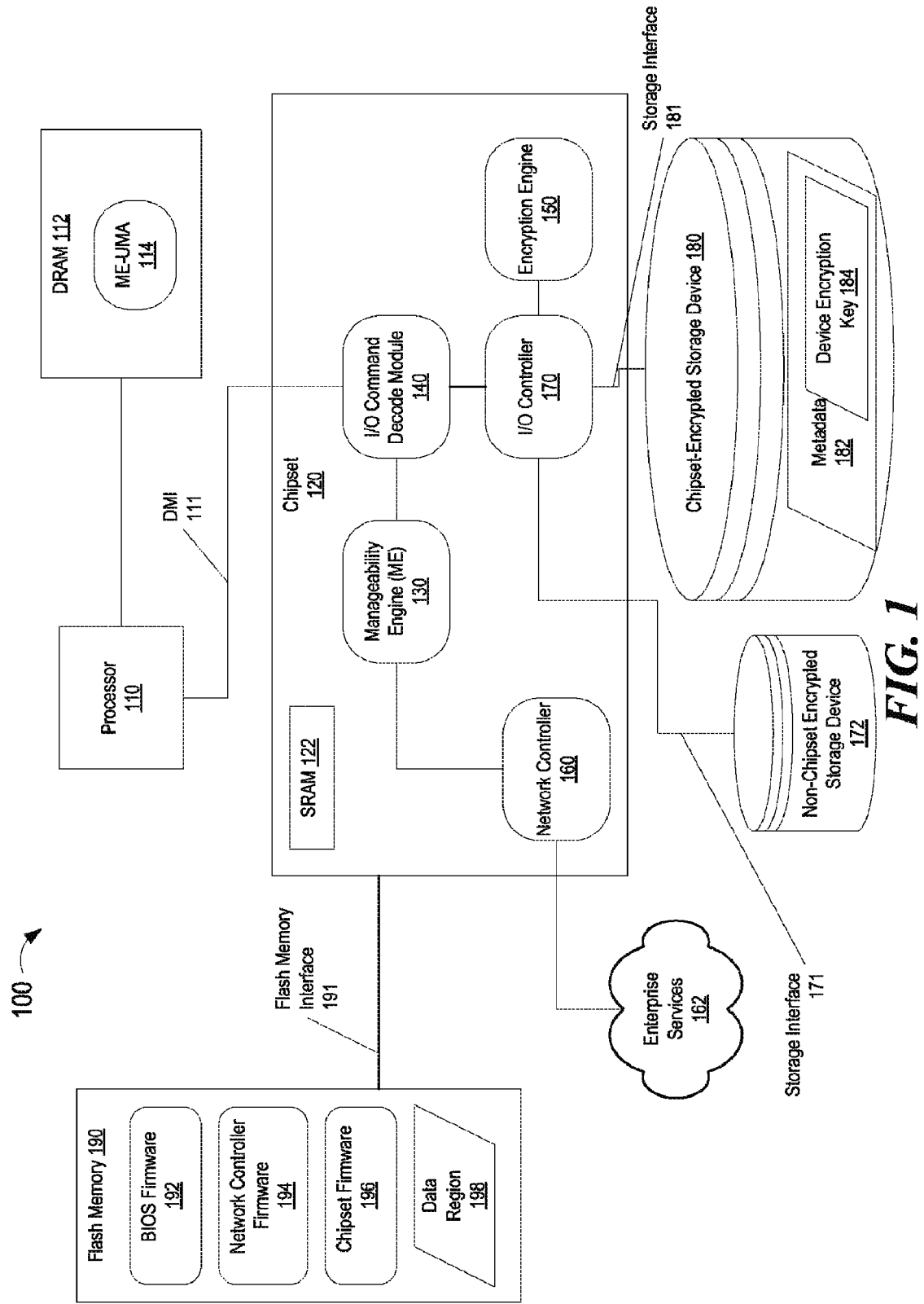
FIG. 1 illustrates a system to provide comprehensive protection of data stored on storage devices in a computing platform, in accordance with an embodiment of the present invention.

FIG. 1 illustrates a system to provide comprehensive protection of data stored on storage devices in a computing platform, in accordance with an embodiment of the present invention. Platform 100 includes a processor 110 connected to a chipset 120 via a desktop management interface (DMI) 111. Chipset 120 includes a manageability engine (ME) 130, which may be implemented as a microprocessor, to manage the configuration and operation of platform 100. In one embodiment, manageability engine (ME) 130 collects audit events, authenticates users, controls access to peripheral devices, manages encryption keys for protection of data stored on storage devices of platform 100, and interfaces with enterprise services 162 via network controller 160. Using enterprise services 162, manageability engine (ME) 130 maintains consistency with enterprise-wide policies for configuration and management of platforms such as platform 100.

Desktop management interface (DMI) 111 connects processor 110 to I/O command decode module 140 of chipset 120. In one embodiment, I/O command decode module 140 is a general-purpose controller that performs storage command decoding and other accelerated operations by using dedicated silicon. The functionality of I/O command decode module 140 may also be implemented entirely in special-purpose hardware. Manageability engine (ME) 130 controls the behavior of I/O command decode module 140 and encryption engine 150 by configuring policies and encryption keys. The operation of manageability engine (ME) 130, I/O command decode module 140, and encryption engine 150 is described in further detail below.

Platform 100 further includes memory devices such as dynamic random access memory (DRAM) 112, static random access memory (SRAM) 122 within chipset 120, and flash memory 190. When platform 100 is fully powered, a portion of DRAM 112 referred to as an upper memory area (UMA), ME-UMA 114, is available for use by manageability engine (ME) 130. The host operating system (not shown in FIG. 1) for platform 100 is not able to access ME-UMA 114, in general, because of a memory isolation mechanism that is configured by the Basic Input Output System (BIOS). This memory isolation mechanism locks access to ME-UMA memory 114 before the host operating system runs. By isolating this portion of DRAM 112 for use by manageability engine 130 from the host operating system, the integrity of manageability engine 130 is protected from viruses or other malware that might infect the operating system.

Flash memory 190 contains firmware used to initialize platform 100. This initialization firmware includes BIOS firmware 192, network controller firmware 194 to configure network controller 160, and chipset firmware 196 to configure chipset 120. The integrity of the chipset firmware 196 for manageability engine (ME) 130 and I/O command decode module 140 is ensured by means of a digital signature before it is stored on the flash memory 190. Data for use by manageability engine (ME) 130, such as user authentication information, may be encrypted by encryption firmware within manageability engine (ME) 130 and stored in a data region 198 of flash memory 190.

The embodiment of platform 100 shown in FIG. 1 further includes different types of storage devices accessible via an I/O controller 170, including non-chipset encrypted storage device 172 accessible via storage interface 171 and chipset-encrypted storage device 180 accessible via storage interface 181. Storage interfaces 171 and 181 may be implemented as either non-volatile memory (NVM) host controller interfaces (HCI) for non-volatile memory or Advanced HCI (AHCI) interfaces for Serial Advanced Technology Attachment (SATA) storage, depending upon the types of storage provided by storage devices 172 and 180.

Data stored on storage devices 172 and 180 may be encrypted. Data stored on chipset-encrypted storage device 180 is encrypted by encryption engine 150 of chipset 120. Chipset-encrypted storage device 180 further includes a reserved area for storing metadata 182, which includes at least one device encryption key (DEK) 184 for storage device 180 and other metadata used by manageability engine (ME) 130. Metadata 182 is protected from being overwritten by applications running on processor 110 during processing of I/O commands by I/O command decode module 140 and I/O controller 170.

In one embodiment, before encryption or decryption of data is performed by the encryption engine 150 of chipset 120, manageability engine (ME) 130 inserts a Device Encryption Key (DEK), such as DEK 184, associated with a storage device involved in an input/output operation into a memory register associated with encryption engine 150. If one physical storage device is logically divided into a number of different logical devices or partitions, then each logical device or partition will have its own respective Device Encryption Key (DEK), and each of those DEKs will be inserted into a respective memory register for encryption engine 150.

Data stored on non-chipset encrypted storage device 172 is encrypted by encryption software or by the storage hardware itself, but not by encryption engine 150. Non-chipset encrypted storage device 172 does not contain chipset-generated metadata similar to metadata 182 of chipset-encrypted storage device 180.

As an example of the operation of the components of platform 100 in response to a write command issued by software running on processor 110, a data write command targeting a particular storage device is issued via DMI interface 111 to I/O command decode module 140. I/O command decode module 140 decodes the command and identifies the data portions to I/O controller 170. For a write command targeting chipset-encrypted storage device 180, I/O controller 170 routes data "on-the-fly" through encryption engine 150, which encrypts the data using a Device Encryption Key (DEK) such as DEK 184 for chipset-encrypted storage device 180 supplied by manageability engine (ME) 130. Encryption engine 150 returns the encrypted data to I/O controller 170 for transmission across storage interface 181 to chipset-encrypted storage device 180. I/O command decode module 140 and I/O controller 170 prevent metadata 182 from being overwritten by abstracting the storage interface 181 so that the area for storing metadata 182 is protected from access by applications running on processor 110.

Non-chipset encrypted storage device 172 may represent a USB device, a NAND flash memory device, a firewire device, or another type of storage device storing data that is not encrypted by encryption engine 150 of chipset 120. For a write command targeting non-chipset encrypted storage device 172, I/O controller 170 does not route the data through encryption engine 150 for encryption. Instead, non-chipset encrypted storage device 172 may be encrypted using software running on host processor 110 or by encryption hardware built into storage device 172. Non-chipset encrypted storage device 172 is used to represent a storage device included in platform 100 that is not configured to be encrypted using the encryption engine 150 of chipset 120, but nevertheless that is protected and managed by manageability engine (ME) 130.

Non-chipset encrypted storage device 172 will also have one or more associated encryption keys, which will be referred to as transient device encryption keys (TDEK) (not shown). For example, normally software-based encryption is performed using the concept of a storage volume rather than using the concept of a device or partition, and the associated encryption keys are referred to as Volume Encryption Keys (VEKs). Volume encryption keys are one example of a type of transient device encryption key (TDEK) that may be stored and managed by manageability engine (ME) 130. Manageability engine (ME) 130 manages encryption keys that are bound to the platform as well as encryption keys that are not bound to the platform. For example, a non-chipset generated encryption key, such as a transient device encryption key generated by encryption software, normally will not be bound to a platform. A DEK that is generated by the storage hardware and physically stored on the device itself may be bound to the device itself but not necessarily to the platform containing the device. Transient DEKs are not stored on the physical storage device that stores the data that they encrypt and are neither bound to the platform nor to the device. Whether the encryption key is bound to the platform/device or not, manageability engine (ME) 130 manages the encryption keys in the same manner.

Manageability engine (ME) 130 manages encryption of all data associated with platform 100, including encryption performed by encryption engine 150 within chipset 120, as well as encryption of data that is not performed by the chipset but instead that is performed by software running on processor 110 or by storage hardware itself. One of the services provided by manageability engine (ME) 130 is management of encryption keys in a common framework and user interface, regardless of the component of the platform 100 that is performing the encryption of the data. Further details about the framework and operation of chipset 120 and manageability engine (ME) 130 in managing encryption of data is provided with reference to FIG. 2.

Figure 2:
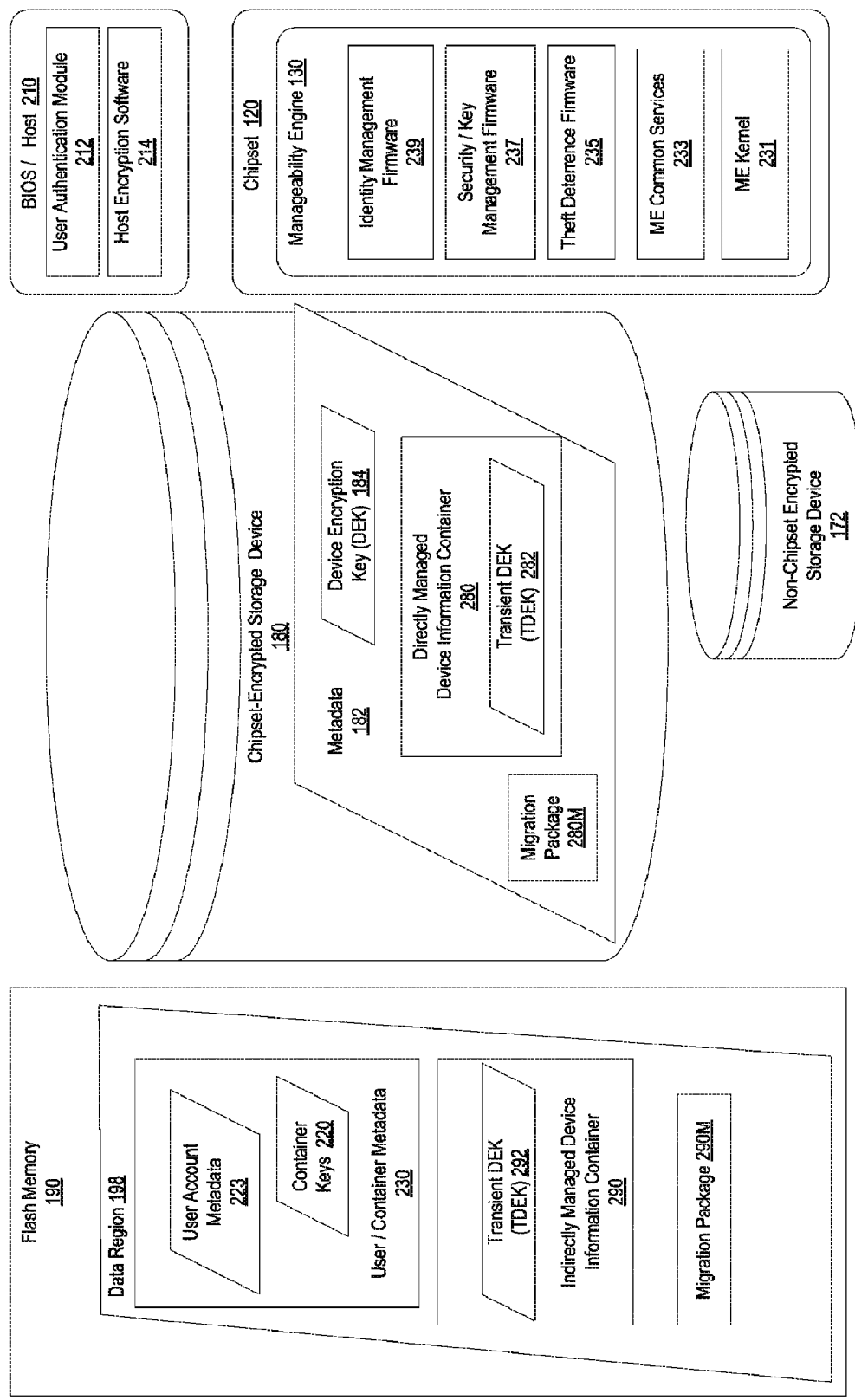
FIG. 2 shows further details of the chipset and manageability engine (ME) of FIG. 1 in managing encryption of data stored in the platform of FIG. 1 in accordance with one embodiment of the present invention.

FIG. 2 shows further details of the chipset 120, manageability engine (ME) 130, and data managed by manageability engine (ME) 130 in accordance with one embodiment of the present invention. Chipset 120 interacts with BIOS/host software 210, which may be loaded by BIOS firmware 192 of FIG. 1 in a pre-boot authentication process. BIOS/host software 210 includes user authentication module 212, which authenticates users of platform 100 during a pre-boot authentication process, and host encryption software 214, which may be used to encrypt data stored on devices such as non-chipset encrypted storage device 172.

The user authentication process performed by user authentication module 212 may include confirming a user's password, biometric data, use of a smart card, or some other authentication process. During the pre-boot authentication process, user authentication module 212 may provide authentication results to identity management firmware 239 within manageability engine (ME) 130 of chipset 120.

Within chipset 120, manageability engine (ME) 130 includes an ME kernel 231, ME common services 233, theft deterrence firmware 235, security/key management firmware 237, and identity management firmware 239. Each of these components is discussed in further detail below.

ME kernel 231 provides basic functionality, including memory usage of SRAM 122 and portions of DRAM 112 (such as ME-UMA 114), storage of data persistently in flash memory 190, and access control. ME kernel 231 controls the operation of I/O command decode module 140 and encryption engine 150.

ME common services 233 include services commonly needed by different firmware modules, and include security services, networking services, and provisioning services. Security services provided by ME common services 233 generally include user authentication consisting of both HTTP Digest and Kerberos authentication; domain authorization using Microsoft Active Directory and/or other services; clock synchronization services to synchronize client and server clocks; and security auditing services.

Networking services provided by ME common services 233 comprise a Transmission Transport Protocol/Internet Protocol (TCP/IP) stack, Transport Layer Security (TLS), Hypertext Transport Protocol (HTTP), Simple Object Access Protocol (SOAP), Web Services for Manageability (WS-MAN), and a host-based TLS interface called the Intel Local Manageability Service (LMS).

Provisioning services provided by ME common services 233 are used in conjunction with enterprise services 162 of FIG. 1 to provision enterprise software to platform 100. These provisioning services support two deployment modes: zero touch and one touch. With zero touch mode, deployment certificate anchor keys are stored in a data storage area such as data region 198 of flash memory 190 of FIG. 1, allowing well-known certificate authority keys to be used to validate IT credentials that can then be used to take ownership of the platform. One touch mode configures organizational certificates, symmetric keys, and trusted hosts that may be used to complete setup and deployment tasks remotely.

Manageability engine (ME) 130 also includes identity management firmware 239, which interacts with user authentication module 212 of BIOS/host software 210. Identity management firmware 239 may compare the user's authentication information with user account metadata 223, which is shown as being stored in a user/container metadata 230 portion of data region 198 of flash memory 190. Identity management firmware 239 may also interact with security/key management firmware 237 of the manageability engine (ME) 130 to confirm that the user's information is also stored in pre-boot authentication (PBA) device information container 280 within chipset-encrypted storage device 180. This confirmation of the user's access to chipset-encrypted storage device 180 provides an additional layer of protection of data stored on chipset-encrypted storage device 180.

Security/key management firmware 237 is used to interact with user authentication module 212 as described above to authenticate users before access to data stored on storage devices associated with platform 100 is allowed. Security/key management firmware 237 manages key management information and stores this key management information in a memory or storage device associated with the platform, such as flash memory 190 or chipset-encrypted storage device 180. The location in which key management information is stored depends upon the storage space available and amount of data to be stored, and the invention is not limited to a particular configuration for storing key management information. In one embodiment, security/key management firmware 237 encrypts the key management information using a platform container key (PCK), which is bound to platform 100.

Key management information managed by security/key management firmware 237 includes encryption keys generated by the chipset (i.e., by encryption engine 150 within chipset 120) and stored in metadata 182, referred to as a Device Encryption Key (DEK) 184. Other types of keys managed by security/key management firmware 237 include encryption keys shown as transient device encryption keys (TDEKs) 282 and 292, which may be generated, for example, by host encryption software 214. TDEKs 282 are stored in directly-managed device information container 280 within chipset-encrypted storage device 180, and TDEKs 292 are shown as stored in indirectly-managed device information container 290 of flash memory 190. The use of the terminology "directly-managed" refers to a device that is both directly encrypted by chipset 120 as well as managed by manageability engine (ME) 130, whereas the use of the term "indirectly managed" refers to the fact that the device is not encrypted by the chipset 120 but the encryption keys for the data stored on the device are nevertheless managed by manageability engine (ME) 130. The operation of security/key management firmware 237 is described in further detail below.

Manageability engine (ME) 130 is further shown as including theft deterrence firmware 235. Theft deterrence firmware 235 can be configured to respond to events such as a theft notification event by a central server such as enterprise services 162 of FIG. 1. Such a theft notification event may be triggered, for example, when manageability engine (ME) 130 observes a maximum number of failed login attempts or when a theft is reported by a user. In one embodiment, platform 100 may be equipped with sensing hardware (not shown) that may also be configured to send a signal to a theft notification server if the platform is moved away from an authorized location. In response to a theft notification event, theft deterrence firmware 235 may perform actions to mitigate the theft, such as disabling processor 110 or parts of chipset 120, disallowing access to flash memory 190, deleting device information container 290 from flash memory 190, deleting contents of metadata 182 of chipset-encrypted storage device 180, or programmatically disallowing access to contents of device information container 290, flash memory 190, metadata 182 and/or device information container 280 of chipset-encrypted storage device 180.

Theft deterrence firmware 235 manages data contained in device information containers 280 and 290. For example, device information containers 280 and 290 include transient device encryption keys (TDEKs) 282 and 292, such as keys used by host encryption software 214 to encrypt and decrypt non-chipset encrypted storage device 172. Non-chipset encrypted volume encryption keys may also include encryption keys generated by storage hardware itself and stored in device information containers 280 and 290 by security/key management firmware 237 of manageability engine (ME) 130. The operation of theft deterrence firmware 235 is described in further detail below.

Device information containers 280 and 290 are each shown as including a respective migration package 280M and 290M. Migration packages 280M and 290M are used by manageability engine 130 and security/key management firmware 237 to provide a common repository for encryption keys for all storage devices associated with platform 100. In one embodiment, key information for both chipset-encrypted storage device 180 and non-chipset encrypted storage device 172 is stored in each of migration packages 280M and 290M. Further detail about the types of keys stored in migration packages 280M and 290M is provided with reference to FIG. 3.

Figure 3:
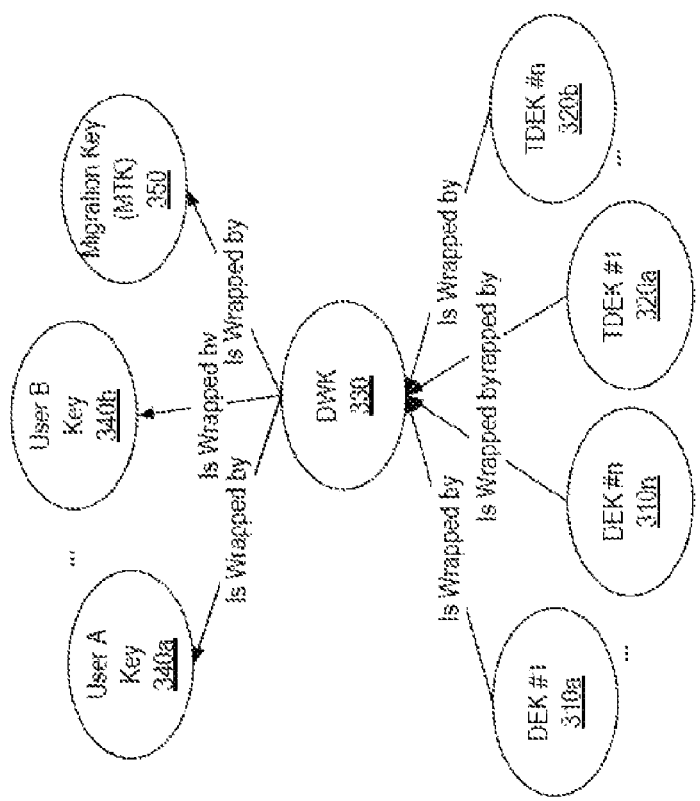
FIG. 3 is a diagram showing the relationships between encryption keys for encrypting data stored on storage devices in accordance with one embodiment of the invention.

Referring to FIG. 3, a diagram showing the relationships between encryption keys for encrypting data stored on storage devices is presented. In one embodiment, security/key management firmware 237 of FIG. 2 protects associated storage devices from theft by further wrapping (further encrypting) a given device encryption key (DEK) 310-310n or transient device encryption key (TDEK) 320a-320n using another key, called a device wrapping key (DWK) 330. The DWK may be, for example, derived from two values dynamically obtained. The first value is a passphrase obtained from a user. The second value is a chipset key, also referred to as a fuse key, which was embedded in hardware at the time of manufacture. Each chipset key is unique to a specific platform, but the chipset key cannot be read externally. The passphrase and chipset key are supplied to a Public-Key Cryptographic Standard (PKCS#5) key derivation function that outputs the device wrapping key (DWK). Because the device wrapping key (DWK) is derived each time the system is powered up, a thief must know the user passphrase and have access to the chipset key to unwrap the device wrapping key (DWK) in order to obtain the DEK or TDEK that is wrapped inside the DWK.

Storage devices encrypted using such a device wrapping key (DWK) are therefore bound to the platform that encrypted the data because of the use of the chipset key/fuse key to wrap the DEK or TDEK. This binding of the device to the platform prevents an attacker from putting a storage device such as chipset-encrypted storage device 180 or non-chipset encrypted storage device 172 into another platform on which an attack tool kit could be used to attempt to circumvent encryption of the data stored on the storage device.

In one embodiment, the device wrapping key (DWK) 330 is further wrapped by additional keys so that the DWK is never in the clear except while in the chipset 120. These additional keys include user keys 340a and 340b. To unwrap the device wrapping key (DWK) 330 and the DEK and TDEK encryption keys that the DWK wraps, a user of the platform must be authenticated as described above.

Because the device wrapping keys (DWKs) generated by security/key management firmware 237 are bound to the platform, additional measures are needed to enable a storage device to be migrated to a different platform. For example, a hard drive might need to be migrated from one platform to another if the original platform becomes inoperable. Such a migration may be performed, for example, using manageability engine (ME) 130 in conjunction with enterprise services 162 shown in FIG. 1. Enterprise services 162 may provide a recovery server and/or a migration server.

To facilitate data recovery, in one embodiment, security/key management firmware 237 also generates a platform-independent key (not shown in FIG. 3) that can be used on a different platform. Typically, such a platform-independent key will wrapped by a token that is at least a 256-bit random number to form a migration key 350. Security/key management firmware 237 may use the migration key 350 to wrap the device wrapping key (DWK) 330 to facilitate migration of the respective encrypted storage devices from one platform to another. Migration key 350 may also be independent of a particular user of the platform, thereby facilitating recovery of the device wrapping key (DWK) 330 if the user account information is corrupted and user keys 340a and 340b cannot be used to unwrap the device wrapping key (DWK) 330.

In one embodiment, platform-independent migration key 350 is stored in migration packages 280M and 290M, and the token used to generate the migration key 350 may also be stored in a remote secure server. In one embodiment, to further facilitate data migration and recovery, a copy of the device wrapping key (DWK) 330 that is bound to the platform is also stored on the remote secure server. The device wrapping key (DWK) 330 can then be used to decrypt the device encryption keys (DEK) 310a-310n and transient device encryption keys (TDEKs) 320a-320n that it wraps.

By wrapping all DEKs 310a-310n and TDEKs 320a-320n with the same device wrapping key as shown in FIG. 3, manageability engine (ME) 130 and/or security/key management firmware 237 can unlock all storage devices associated with the platform at the same time. This common wrapping key DWK 330 enables the granularity of locking the storage devices to be performed at the platform level even though the individual storage devices have their own unique encryption keys DEKs 310a-310n and TDEKs 320a-320n. Unlocking a storage device is described in further detail below with reference to FIG. 7, and initialization of a storage device is described in further detail below with reference to FIG. 6.

Figure 4:
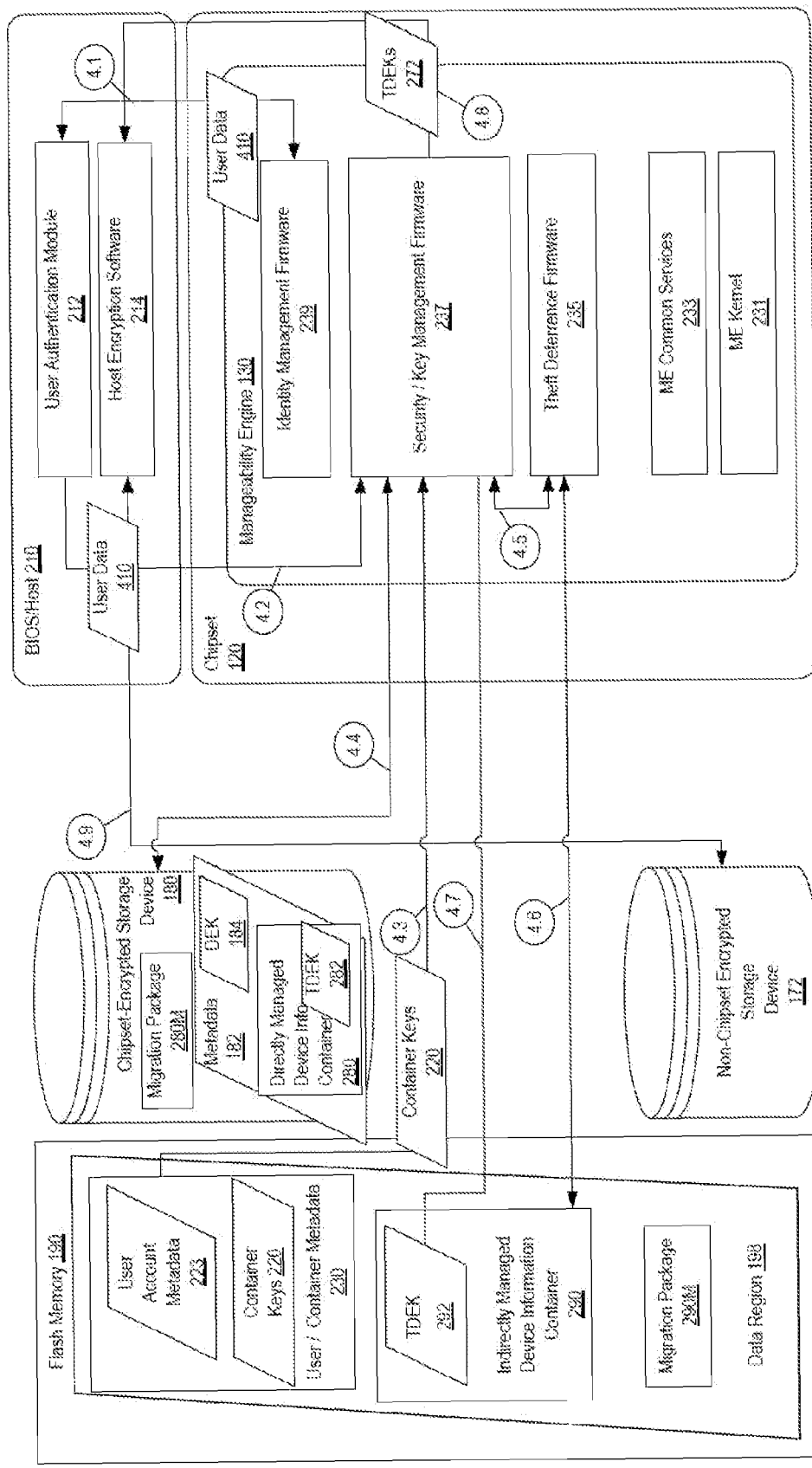
FIG. 4 is a data flow diagram showing the interaction of the components of FIG. 2 in controlling access to the storage devices of the computing platform.

FIG. 4 is a data flow diagram showing the interaction of the components of FIG. 2 in controlling access to the storage devices of platform 100. In action 4.1, user authentication module 212 and identity management firmware 239 interact as described above to authenticate user data 410. In action 4.2, user authentication module 212 provides user data 410 to security/key management firmware 237. In action 4.3, security/key management firmware 237 compares user data 410 to user data contained in user account metadata 223 in user/ container metadata 230 of data region 198 of flash memory 190, and finding that the user data matches, obtains container keys 220. Container keys 220 are used to decrypt key management information stored by security/key management firmware 237. For example, container keys 220 may be implemented as a platform container key (PCK) that is bound to platform 100.

In action 4.4, security/key management firmware 237 uses container keys 220 to decrypt metadata 182 in chipset-encrypted storage device 180, including Device Encryption Key (DEK) 184. Using DEK 184, security/key management firmware 237 decrypts data stored in chipset-encrypted storage device 180. Container keys 220 are also used to decrypt the data contained in device information container 280, including TDEK 282. In action 4.5, security/key management firmware 237 interacts with theft deterrence firmware 235 to ascertain that the storage devices associated with platform 100 are not inaccessible due to a theft notification. In action 4.6, theft deterrence firmware 235 accesses device information container 290 to obtain information about status of the storage devices associated with platform 100. If a theft had been detected or reported, or a theft notification received, security/key management firmware 237 could transfer control to theft deterrence firmware 235 to take remedial measures, such as denying access to platform 100. Actions that could be taken to deny access to platform 100 might include disabling hardware, deleting keys and/or key containers, denying access to a migration package, and/or denying access to keys and/or key containers. By deleting or disabling access to keys and/or key containers, a brute force attempt to decrypt the key containers can be thwarted.

Referring again to FIG. 4, in action 4.7, in the absence of a theft notification, security/key management firmware 237 uses container keys 220 to decrypt the data stored in device information container 290, which includes transient device encryption keys (TDEKs) 292. Recall that transient device encryption keys (TDEKs) 292 may include the encryption keys used by host encryption software 214 or original storage hardware to encrypt data stored on non-chipset encrypted storage device 172. In action 4.8, security/key management firmware 237 provides transient device encryption keys (TDEKs) 292 to host encryption software 214, and in action 4.9, host encryption software 214 decrypts non-chipset encrypted storage device 172. If the transient device encryption keys (TDEKs) 292 were instead produced by the original storage hardware, then the TDEKs 292 could be used to decrypt the data on non-chipset encrypted storage device 172.

Thus, with a single login to the system, the user can access encrypted data on both chipset-encrypted storage device 180 and on non-chipset encrypted storage device 172. By controlling the keys for decryption of both chipset-encrypted devices and devices not encrypted by the platform chipset, security/key management firmware 237 of manageability engine 130 provides comprehensive protection of data stored on storage devices associated with platform 100. By working in conjunction with identity management firmware 239 to control user access to devices, and with theft deterrence firmware 235 to respond to theft notifications, the security of data associated with the protected platform is ensured.

Figure 5:
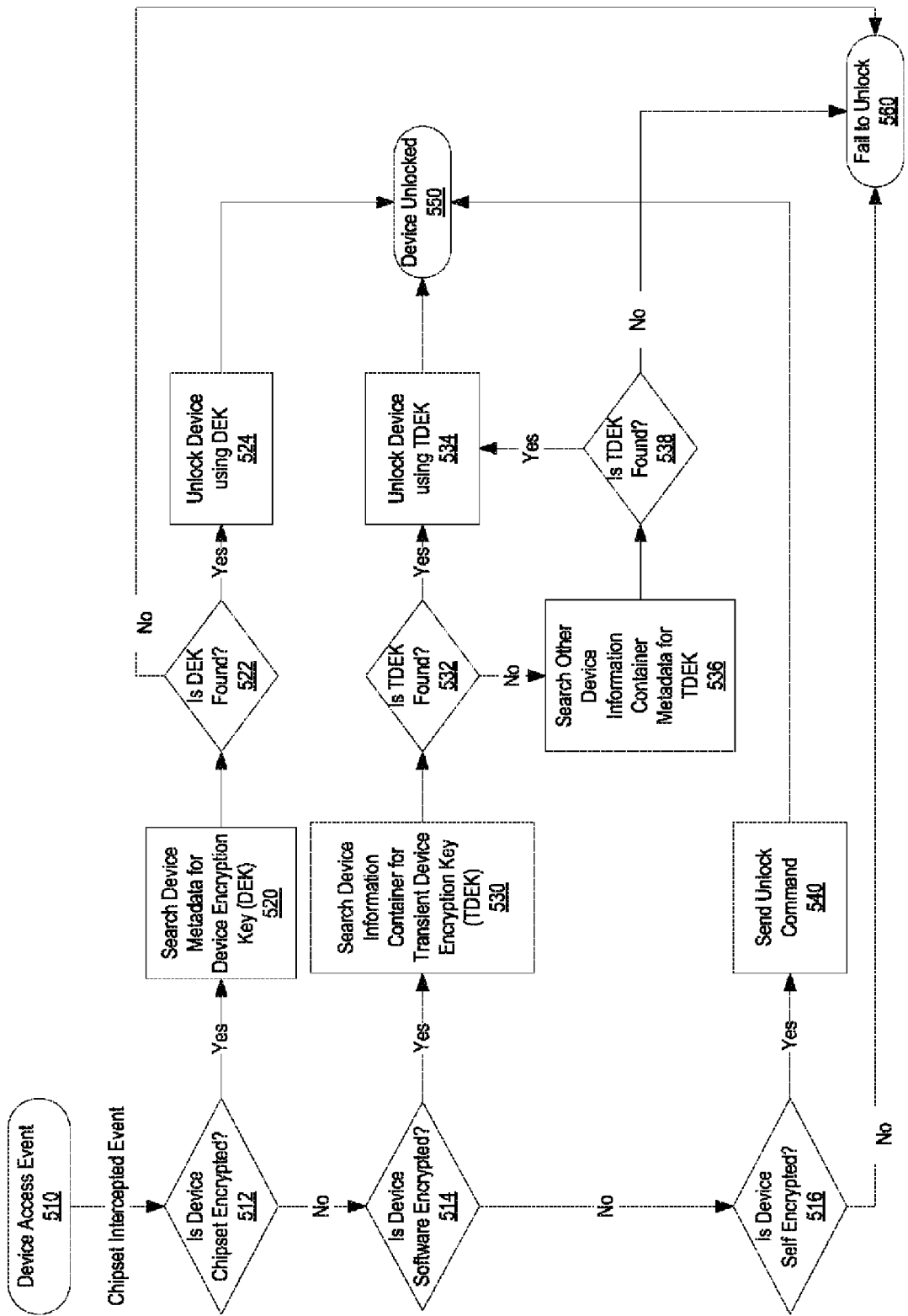
FIG. 5 is a flowchart showing operation of the manageability engine (ME) of FIG. 1 in processing a device access event in accordance with one embodiment of the invention.

FIG. 5 is a flowchart showing operation of the manageability engine (ME) of FIG. 1 in processing a device access event in accordance with one embodiment of the invention. The steps of FIG. 5 will be described as being performed by manageability engine (ME) 130 and/or the security/key management firmware 237 component of manageability engine (ME) 130. At "Device Access Event" step 510, manageability engine (ME) 130 intercepts a device access event such as a reset of the platform or hot-plugging a device such as non-chipset encrypted storage device 172 into the platform. Control then proceeds to "Is Device Chipset Encrypted" decision point 512, where a determination is made whether the inserted device has been encrypted by the chipset. Such as determination may involve examining whether metadata such as metadata 182 are present on the storage device. If the device is encrypted by the chipset, control proceeds to "Search Device Metadata for Device Encryption Key (DEK)" step 520. A search of metadata 182 on the storage device for DEK 184 is performed, and control proceeds to "Is DEK Found?" decision point 522. If a DEK is found, control proceeds to "Unlock Device using DEK" step 524. The device is unlocked and control proceeds to "Device Unlocked" state 550. Unlocking a device is described in further detail with reference to FIG. 7. If a DEK is not found at "Is DEK Found" decision point 522, control proceeds to "Fail to Unlock" state 560. In "Fail to Unlock" state 560, the device remains locked because the device encryption key could not be located.

At "Is Device Chipset Encrypted" decision point 512, if the inserted device has not been encrypted by the chipset, control proceeds to "Is Device Software Encrypted?" decision point 514. A determination of whether the device is software encrypted may be made, for example, by comparing an identifier for the device to device identifiers found in device information containers such as directly-managed device information container 280 and indirectly-managed device information container 290. If the device identifier is found in one of the device information containers, control proceeds to "Search Device Information Container for Transient Device Encryption Key (TDEK)" step 530. A device information container is searched, and control proceeds to "Is TDEK Found?" decision point 532. If the TDEK is found, control proceeds to "Unlock Device using TDEK" step 534. The device is unlocked and control proceeds to "Device Unlocked" state 550. Unlocking a device is described in further detail with reference to FIG. 7.

If a TDEK for the software-encrypted device is not found at "Is TDEK Found?" decision point 532, control proceeds to "Search Other Device Information Container Metadata for TDEK" step 536. If other device information container metadata exists, it is searched and control proceeds to "Is TDEK Found?" decision point 538. If no other device information container metadata exists, then control proceeds to "Is TDEK Found?" decision point 538. From "Is TDEK Found?" decision point 538, if the TDEK for the software-encrypted device is not found, control proceeds to "Fail to Unlock" state 560. In "Fail to Unlock" state 560, the device remains locked because the device encryption key could not be located. From "Is TDEK Found?" decision point 538, if the TDEK for the software-encrypted device is found, control proceeds to "Unlock Device using TDEK" step 534 and proceeds as described above.

At "Is Device Software Encrypted?" decision point 514, if the device is not determined to have been encrypted by software, control proceeds to "Is Device Self-Encrypted?" decision point 516. A determination whether a device is self-encrypted can be made, for example, by issuing ATA security commands. If the device is self-encrypted, control proceeds to "Send Unlock Command" step 540, where an unlock command is sent to the device. The device is unlocked and control proceeds to "Device Unlocked" state 550.

If the device is not self-encrypted at "Is Device Self-Encrypted?" decision point 516, control proceeds to "Fail to Unlock" state 560. The device is not unlocked. Processing the device access event begun in "Device Access Event" step 510 is complete without unlocking the device.

Figure 6:
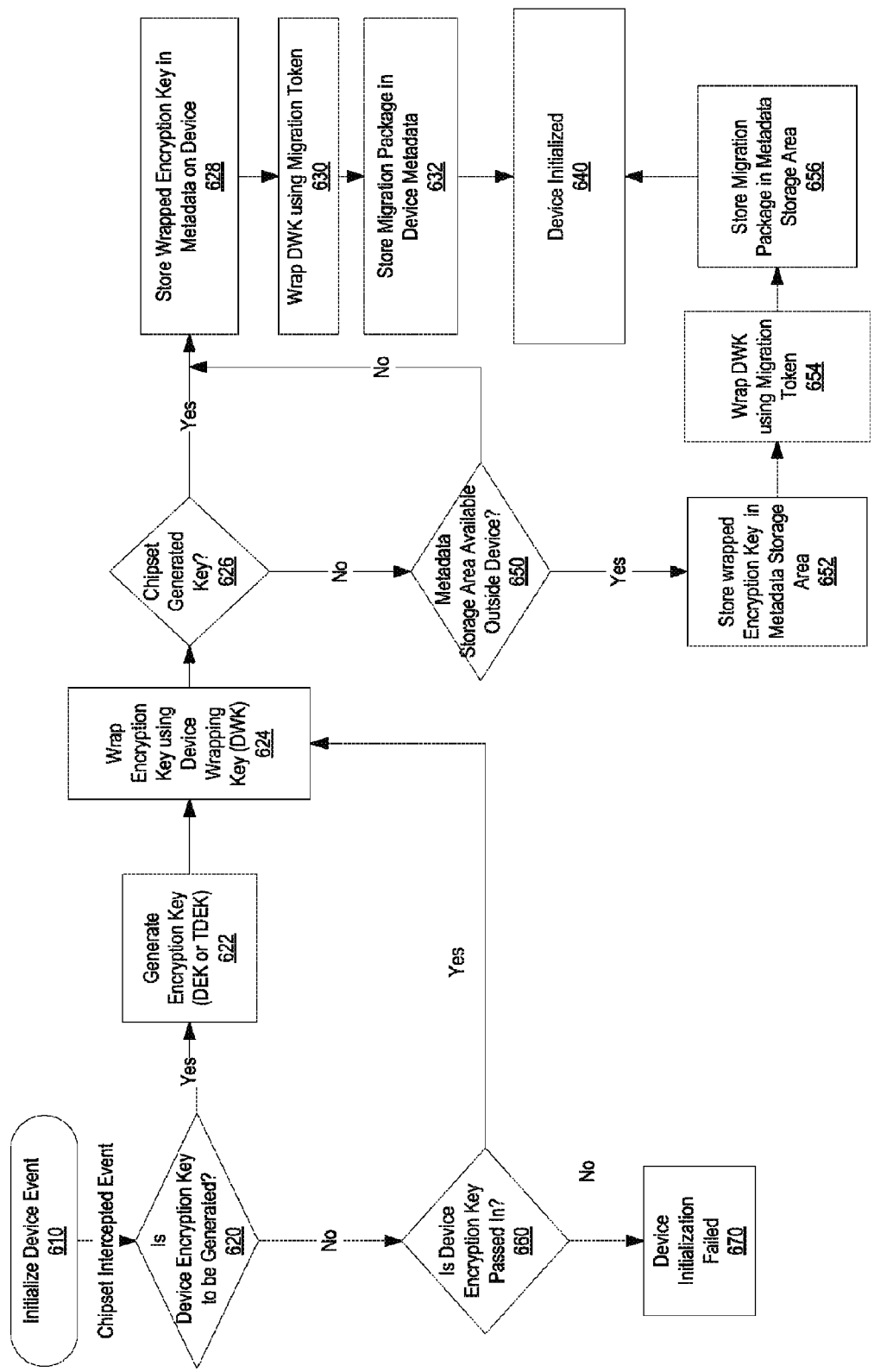
FIG. 6 is a flowchart showing the operation of the manageability engine (ME) of FIG. 1 in processing an initialize device event in accordance with one embodiment of the invention.

FIG. 6 is a flowchart showing the operation of the manageability engine (ME) of FIG. 1 in processing an initialize device event in accordance with one embodiment of the invention. The steps of FIG. 6 will be described as being performed by manageability engine (ME) 130 and/or the security/key management firmware 237 component of manageability engine (ME) 130. At "Initialize Device Event" step 610, manageability engine (ME) 130 intercepts an initialize device event. Control proceeds to "Is Device Encryption Key to be Generated?" decision point 620. If the encryption key for the device to be initialized is to be generated, control proceeds to "Generate Encryption Key (DEK or TDEK)" step 622. The encryption key may be generated, for example, using a random number generator. Control then proceeds to "Wrap Encryption Key using Device Wrapping Key (DWK)" step 624. For example, the device encryption key (DEK) such as one of DEKs 310a-310n of FIG. 3 or the transient device encryption key (TDEK) such as one of TDEKs 320a-320n of FIG. 3 is wrapped by a device wrapping key (DWK) such as DWK 330 of FIG. 3.

Control proceeds from "Wrap Encryption Key using Device Wrapping Key (DWK)" step 624 to "Chipset Generated DEK?" decision point 626, where a determination is made whether the encryption key was generated by the chipset, such as DEK 184 of chipset-encrypted storage device 180. If the encryption key was generated by the chipset, control proceeds to "Store Wrapped DEK in Metadata on Device" step 628, where the DEK is stored directly on the device, such as DEK 184 in metadata 182 of chipset-encrypted storage device 180. Control then proceeds to "Wrap DWK using Migration Token" step 630, where the DWK is further wrapped using a migration token that is platform independent to produce a migration key such as migration key 350 of FIG. 3. Control then proceeds to "Store Migration Package in Device Metadata" step 632, where the migration key and other migration data are stored as a migration package in device metadata. For example, migration package 280M is stored within metadata 182 of chipset-encrypted storage device 180. Initialization of the device is then complete, as shown by the transition to "Device Initialized" step 640.

At "Chipset Generated Key?" decision point 626, if the encryption key is not generated by the chipset, control proceeds to "Metadata Storage Area Available Outside Device?" decision point 650. If a storage area is available outside the device for storing device metadata, such as a device information container, control proceeds to "Store Wrapped Encryption Key in Metadata Storage Area" step 652. The wrapped encryption key may be stored, for example, in a device information container such as one of device information containers 280 or 290. Control then proceeds to "Wrap DWK Using Migration Token" step 654, where the DWK is wrapped using a migration token to produce a migration key such as migration key 350 of FIG. 3. Control then proceeds to "Store Migration Package in Metadata Storage Area" step 656, where the migration key and other migration data are stored as part of a migration package, such as migration package 290M in the data region 198 of flash memory 190. Control then proceeds to "Device Initialized" step 640, where initialization of the device is complete.

At "Metadata Storage Area Available Outside Device?" decision point 650, if no metadata storage area is available outside the device, control transitions to "Store Wrapped Encryption Key in Metadata on Device" step 628. The wrapped TDEK is stored directly on the device, such as TDEK 282 stored in directly-managed device information container 280. Control then proceeds from "Store Wrapped Encryption Key in Metadata on Device" step 628 through "Device Initialized" step 640 as described above.

At "Is Device Encryption Key to be Generated?" decision point 620, if the encryption key is not to be generated, control proceeds to "Is Device Encryption Key Passed In?" step 660. If the device encryption key is passed in as part of the initialize device event, control proceeds to "Wrap Encryption Key using Device Wrapping Key (DWK)" step 624. If the device encryption key is not passed in as part of the initialize device event, control proceeds to "Device Initialization Failed" step 670 and the device is not initialized.

Figure 7:
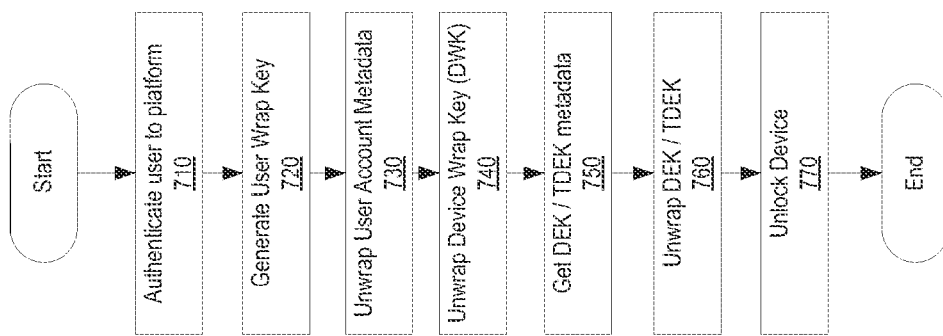
FIG. 7 is a flowchart showing the operation of the manageability engine (ME) of FIG. 1 in unlocking a device in accordance with one embodiment of the invention.

FIG. 7 is a flowchart showing the operation of the manageability engine (ME) of FIG. 1 in unlocking a device in accordance with one embodiment of the invention. Control begins with "Authenticate User to Platform" step 710, where the user's access to the platform is authenticated as described above. Control proceeds to "Generate User Wrap Key" step 720k, where a user wrap key such as 340a or 340b is generated. Control then proceeds to "Unwrap User Account Metadata" step 730, where the user account metadata is unwrapped as described above with reference to FIG. 4. Control then proceeds to "Unwrap Device Wrap Key (DWK)" step 740, where the device wrapping key is unwrapped. Control then proceeds to "Get DEK/TDEK Metadata" step 750, where metadata for the DEK/TDEK is obtained, as previously described with reference to FIG. 5. Control then proceeds to "Unwrap DEK/TDEK" step 760, where the device encryption key DEK/TDEK is unwrapped. Control then proceeds to "Unlock Device" step 770, where the device is unlocked.

Figure 8:
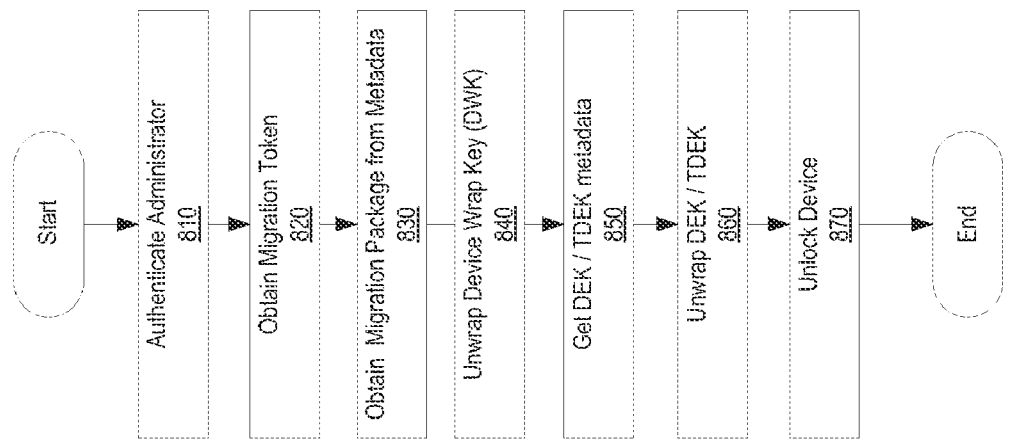
FIG. 8 is a flowchart showing the operation of the manageability engine (ME) of FIG. 1 in migrating a device from one platform to another in accordance with one embodiment of the invention.

FIG. 8 is a flowchart showing the operation of the manageability engine (ME) of FIG. 1 in migrating a device from one platform to another in accordance with one embodiment of the invention. Control begins at "Authenticate Administrator" step 810, where an administrator seeking to perform the migration is authenticated in a manner similar to the user authentication process described herein. Control then proceeds to "Obtain Migration Token" step 820, where a migration token for the device is obtained. In one embodiment, the migration token is obtained from a remote server. Control then proceeds to "Obtain Migration Package from Metadata" step 830, where the migration package is obtained from metadata, such as migration package 290M being obtained from data region 198 of flash memory 190 or migration package 280M being obtained from metadata 182 of chipset-encrypted storage device 180.

Control then proceeds to "Unwrap Device Wrap Key (DWK)" step 840, where the device wrapping key is unwrapped. Control then proceeds to "Get DEK/TDEK Metadata" step 850, where metadata for the DEK/TDEK is obtained, as previously described with reference to FIG. 5. Control then proceeds to "Unwrap DEK/TDEK" step 860, where the device encryption key DEK/TDEK is unwrapped. Control then proceeds to "Unlock Device" step 870, where the device is unlocked.

Figure 9:
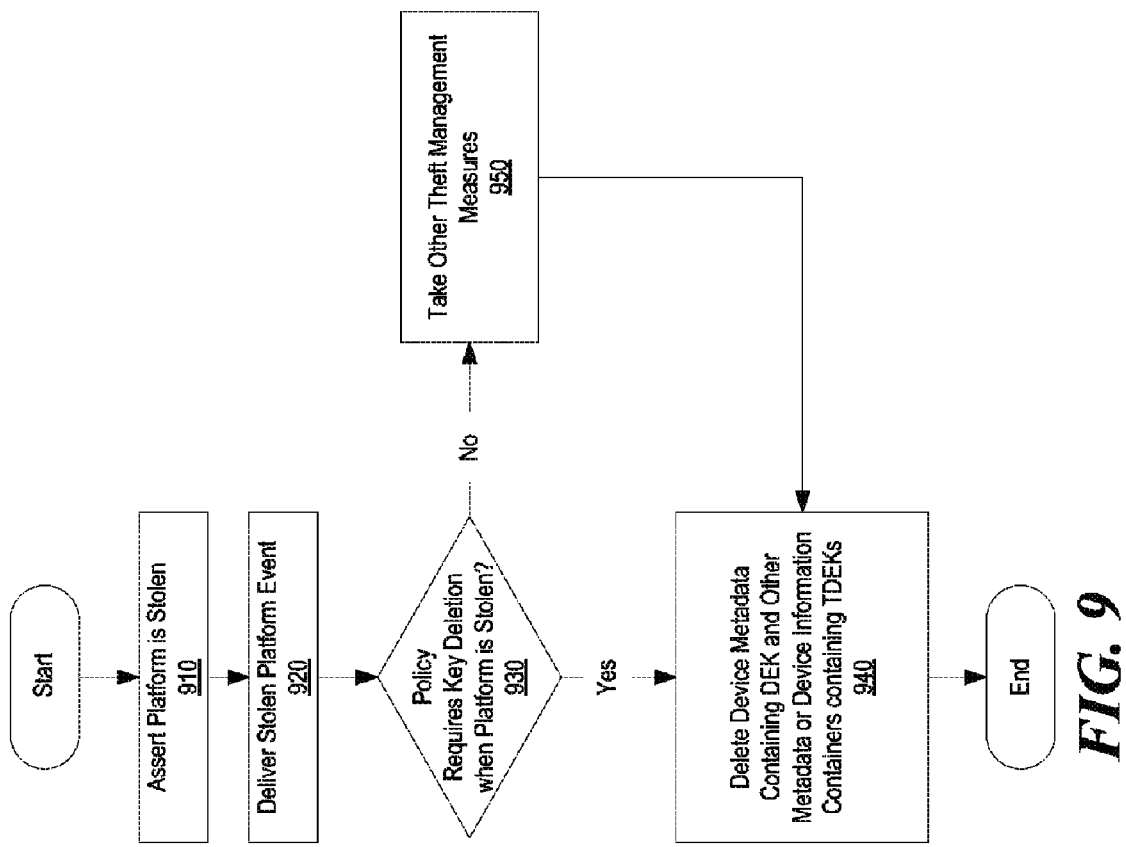
FIG. 9 is a flowchart showing the operation of the manageability engine (ME) of FIG. 1 in processing a stolen platform in accordance with one embodiment of the invention.

FIG. 9 is a flowchart showing the operation of the manageability engine (ME) of FIG. 1 in processing a stolen platform in accordance with one embodiment of the invention. Control begins with "Assert Platform is Stolen" step 910, where manageability engine (ME) 130 issues an assertion that the platform has been stolen. This assertion may be broadcast, for example, by a theft detection server within enterprise services 162 of FIG. 1. Control then proceeds to "Deliver Stolen Platform Event" step 920, where a stolen platform event is delivered to the platform that has been stolen. This event may be generated and delivered by a theft detection server within enterprise services 162 of FIG. 1.

From "Deliver Stolen Platform Event" step 920, control proceeds to "Policy Requires Key Deletion when Platform is Stolen" decision point 930, where a determination is made whether enterprise policy requires that all keys for stolen platform be deleted. If enterprise policy does require that keys be deleted, control proceeds to "Delete Device Metadata Containing DEK and Other Metadata or Device Information Containers containing TDEKs" step 940, where all keys are deleted from all metadata repositories, including device metadata such as metadata 182 of chipset-encrypted storage device 180 and device information containers 280 and 290. Deletion of the keys may involve deletion of the entire container containing the keys.

At "Policy Requires Key Deletion when Platform is Stolen" decision point 930, if policy does not require key deletion, control proceeds to "Take Other Theft Management Measures" step 950, where other measures can be taken to deal with the stolen platform in accordance with enterprise policy.

Figure 10:
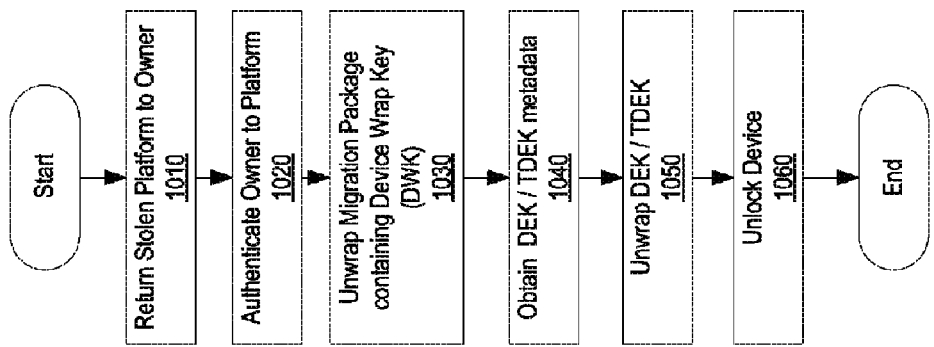
FIG. 10 is a flowchart showing the operation of the manageability engine (ME) of FIG. 1 in recovering a stolen platform in accordance with one embodiment of the invention.

FIG. 10 is a flowchart showing the operation of the manageability engine (ME) of FIG. 1 in recovering a stolen platform in accordance with one embodiment of the invention. Control begins with "Return Stolen Platform to Owner" step 1010, where the stolen platform is returned to the owner. Control proceeds to "Authenticate Owner to Platform" step 1020, where the owner is authenticated to the platform. Control then proceeds to "Unwrap Migration Package containing Device Wrap Key (DWK)" step 1030, where the migration package is unwrapped to produce the DWK such as DWK 330 of FIG. 3. Control then proceeds to "Obtained DEK/TDEK Metadata" step 1040, where the DEK/TDEK metadata is obtained as described with reference to FIG. 5. Control then proceeds to "Unwrap DEK/TDEK" step 1050, where the device encryption key DEK/TDEK is unwrapped. Control then proceeds to "Unlock Device" step 1060, where the device is unlocked.

Figure 11:
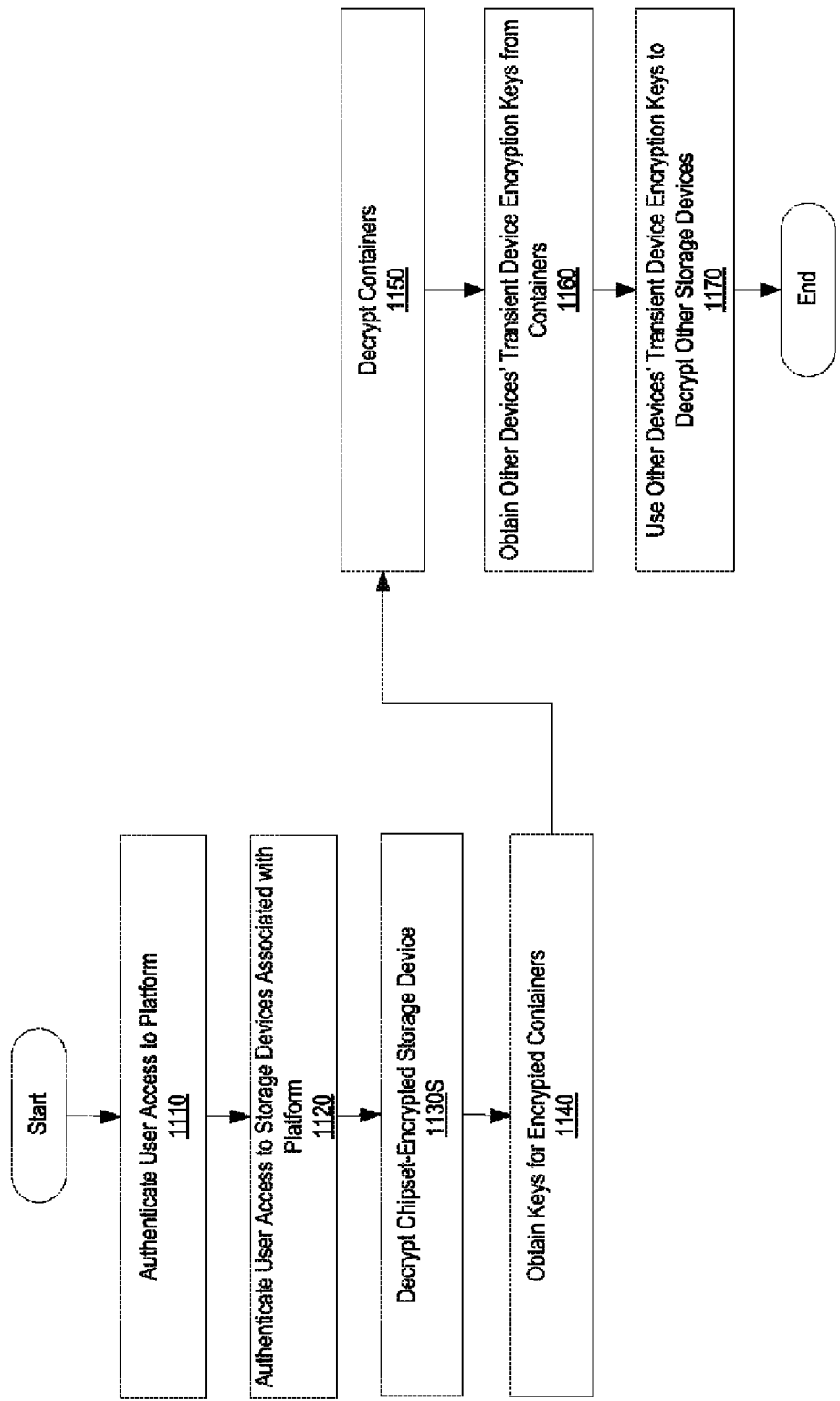
FIG. 11 is a flowchart showing the operation of the access control components of the platform of FIGS. 1 and 2 in accordance with one embodiment of the invention.

FIG. 11 is a flowchart showing the operation of the access control components of platform 100 in accordance with one embodiment of the invention. In "Authenticate User Access to Platform" step 1110, user data such as a password, biometric data, or smartcard information for a user requesting access to a platform is authenticated, as described above with reference to user authentication module 212 in conjunction with identity management firmware 239. This authentication may include confirming the user's identity with identity management servers such as Microsoft Active Directory or LDAP servers to ensure that the user is authorized to access corporate data that may be stored on storage devices associated with platform 100. Authentication of the user may also include confirming that the platform and/or storage devices associated with the platform have not been lost or stolen with theft deterrence firmware 235.

When the user's data is authenticated and access to the platform is confirmed, control proceeds to "Authenticate User Access to Storage Devices Associated with Platform" step 1120. User access to both chipset-encrypted storage device 180 and to non-chipset encrypted storage device 172 would be authenticated. This confirmation may include verifying that the user's data appears not only in flash memory 190 as described above, but may also include confirming that the user's data appears also within device information container 280 stored on the chipset-encrypted storage device 180. Upon successful confirmation of the user's authority to access the storage devices associated with the platform, the process of enabling the user to access data stored on associated storage devices continues.

When the user is confirmed to have access to the storage devices associated with the platform, control proceeds to "Decrypt Chipset-Encrypted Storage Device" step 1130. Decryption of data stored on chipset-encrypted storage device 180 is performed using a Device Encryption Key (DEK) stored in metadata on the chipset-encrypted storage device. Control proceeds to "Obtain Keys for Encrypted Containers" step 1140, where the encryption keys for encrypted containers containing key management information are stored. As described above, in one embodiment, these container keys are obtained from user account metadata 223 of user/container metadata 230 within data region 198 of flash memory 190 of FIGS. 2 and 3. Control then proceeds to "Decrypt Containers" step 1150, where, as described above with reference to FIG. 3, container keys 220 are further used to decrypt both device information container 280 containing security firmware metadata and device information container 290, which contains transient device encryption keys (TDEKs) 292 for non-chipset encrypted storage device 172.

After decrypting the chipset-encrypted storage devices and containers in steps 1130-1150, control proceeds to "Obtain Other Devices' Transient Device Encryption Keys from Containers" step 1160. As noted above, device information container 290 further contains encryption keys for devices not encrypted by the platform chipset. Control then proceeds to "Use Other Devices' Transient Device Encryption Keys to Decrypt Other Storage Devices" step 1170. In the case of data that was encrypted by host encryption software, such as host encryption software 214, the original decryption key is forwarded to the host encryption software and data stored on the other storage devices are decrypted.

The steps described with reference to FIG. 11 control access to data stored in storage devices associated with platform 100. The framework and infrastructure for controlling access to the data described herein also support migration of data and storage devices from one platform to another, as well as key recovery and theft notification activities. By providing a common framework for managing encryption keys for both chipset-encrypted and non-chipset encrypted devices, both types of devices can be migrated in a single migration, recovery, or theft mitigation event.

Furthermore, by storing encryption keys for each user associated with a storage device, data and/or storage devices can be migrated and/or recovered on a user level of granularity. Access to data on the target platform can be limited to selected users by including only those selected users in the user account information on the target platform. Centralized identity management services can be cross-checked to confirm that access for each user is appropriate for the target platform. Centralized theft management services can also be used to confirm that storage devices are not subject to theft. Because the framework includes encryption keys for standalone storage devices such as USB storage devices, access to these standalone encrypted devices can be disabled whether the storage devices are attached to the platform or not. Thus, a stolen USB device can be disabled until a legitimate user logs in or until an administrator reverses a theft notification.

FIG. 7 is a flowchart showing the operation of the manageability engine (ME) of FIG. 1 in unlocking a device in accordance with one embodiment of the invention.

FIG. 8 is a flowchart showing the operation of the manageability engine (ME) of FIG. 1 in initializing a device in accordance with one embodiment of the invention.

FIG. 9 is a flowchart showing the operation of the manageability engine (ME) of FIG. 1 in unlocking a device after retrieving an encryption key for data stored on the device in accordance with one embodiment of the invention.

FIG. 10 is a flowchart showing the operation of the manageability engine (ME) of FIG. 1 in migrating a device in accordance with one embodiment of the invention.

FIG. 11 is a flowchart showing the operation of the manageability engine (ME) of FIG. 1 in processing a stolen platform in accordance with one embodiment of the invention.

FIG. 12 is a flowchart showing the operation of the manageability engine (ME) of FIG. 1 in recovering a stolen platform in accordance with one embodiment of the invention.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing comprehensive protection of data stored on storage devices associated with a platform. While particular embodiments of the present invention have been shown and described, it will be obvious to those skilled in the art that numerous changes, variations, and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:
   encrypting, by chipset encryption hardware of a first platform, data stored on a first storage device of the first platform using a first encryption key;
   encrypting, by an encryption mechanism other than the chipset encryption hardware, data stored on a second storage device of the first platform using a second encryption key;
   generating a first migration token;
   encrypting the first encryption key with the first migration token to generate a first platform-independent migration key;
   storing the first platform-independent migration key in the first storage device;
   storing the first migration token in a remote storage location;
   migrating the first storage device from the first platform to a second platform;
   retrieving, by the second platform, the first migration token from the remote storage location;
   decrypting, on the second platform, the first platform-independent migration key with the retrieved first migration token to obtain the first encryption key; and
   decrypting, on the second platform, the data stored on the first storage device using the first encryption key.

2. The method of claim 1, wherein storing the first platform-independent migration key in the first storage device comprises storing the first platform-independent migration key in a first migration package stored in the first storage device.

3. The method of claim 1, further comprising:
   generating a second migration token;
   encrypting the second encryption key with the second migration token to generate a second platform-independent migration key;
   storing the second platform-independent migration key in memory of the first platform;
   storing the second migration token in the remote storage location;
   migrating the second storage device from the first platform to the second platform;
   retrieving, by the second platform, the second migration token from the remote storage location;
   obtaining, by the second platform, the second platform-independent migration key from the memory of the first platform;
   decrypting, on the second platform, the second platform-independent migration key with the retrieved second migration token to obtain the second encryption key; and
   decrypting, on the second platform, the data stored on the second storage device using the second encryption key.

4. The method of claim 3, wherein storing the second platform-independent migration key in memory of the first platform comprises storing the second platform-independent migration key in a second migration package stored in the memory of the first platform.

5. The method of claim 3, further comprising:
   generating, on the first platform, a device wrapping key; and
   storing the device wrapping key in the remote storage location,
   wherein encrypting the first and second encryption keys with the first and second migration tokens comprises encrypting each of the first and second encryption keys using the device wrapping key and subsequently encrypting the encrypted first and second encryption keys using the first and second migration tokens to generate each of the first and second platform-independent migration keys.

6. The method of claim 5, wherein generating, on the first platform, a device wrapping key comprises deriving the device wrapping key from a passphrase obtained from a user of the first platform and a chipset key embedded in hardware of the first platform.

7. The method of claim 5, further comprising:
retrieving, by the second platform, the device wrapping key from the remote storage location, and wherein decrypting the first platform-independent migration key with the retrieved first migration token to obtain the first encryption key comprises first decrypting the first platform-independent migration key with the retrieved first migration token to obtain the encrypted first encryption key; and
decrypting, on the second platform, the encrypted first encryption key with the retrieved device wrapping key to obtain the first encryption key.

8. The method of claim 5, further comprising:
retrieving, by the second platform, the device wrapping key from the remote storage location, and wherein decrypting the second platform-independent migration key with the retrieved second migration token to obtain the second encryption key comprises first decrypting the second platform-independent migration key with the retrieved second migration token to obtain the encrypted second encryption key; and
decrypting, on the second platform, the encrypted second encryption key with the retrieved device wrapping key to obtain the second encryption key.

9. The method of claim 1, further comprising:
determining a theft status of the first and second storage devices of the first platform; and
denying access to the first platform in response to determining that the first platform has a theft status indicative of being lost or stolen.

10. The method of claim 9, wherein denying access to the first platform in response to determining that the first platform has a theft status indicative of being lost or stolen comprises deleting the first and second encryption keys from the first platform.

11. The method of claim 9, wherein denying access to the first platform in response to determining that the first platform has a theft status indicative of being lost or stolen comprises disabling hardware of the first platform.

12. A system comprising:
a first platform including a first processor, a Manageability Engine (ME) to manage one or more encryption keys of the first platform, an encryption engine to encrypt data on the first platform, and a first memory having stored therein a plurality of instructions that, in response to being executed by the first processor, causes the first processor to:
encrypt data stored on a first storage device of the first platform using a first encryption key,
encrypt, by an encryption mechanism other than the encryption engine, data stored on a second storage device of the first platform using a second encryption key,
generate a first migration token,
encrypt the first encryption key with the first migration token to generate a first platform-independent migration key,
store the first platform-independent migration key in the first storage device,
store the first migration token in a remote storage location, and
migrate the first storage device from the first platform to a second platform; and
the second platform including a second processor and a second memory having stored therein a plurality of instructions that, in response to being executed by the second processor, causes the second processor to:
retrieve the first migration token from the remote storage location,
decrypt the first platform-independent migration key with the retrieved first migration token to obtain the first encryption key, and
decrypt the data stored on the first storage device using the first encryption key.

13. The system of claim 12, wherein the plurality of instructions that, in response to being executed by the first processor, causes the first processor to store the first platform-independent migration key in the first storage device comprises to store the first platform-independent migration key in a first migration package stored in the first storage device.

14. The system of claim 12, further comprising instructions that, in response to be executed by the first processor, causes the first processor to:
generate a second migration token;
encrypt the second encryption key with the second migration token to generate a second platform-independent migration key;
store the second platform-independent migration key in memory of the first platform;
store the second migration token in the remote storage location; and
migrate the second storage device from the first platform to the second platform.

15. The system of claim 14, wherein the plurality of instructions that, in response to being executed by the first processor, causes the first processor to store the second platform-independent migration key in memory of the first platform comprises to store the second platform-independent migration key in a second migration package stored in the memory of the first platform.

16. The system of claim 14, further comprising instructions that, in response to be executed by the second processor, causes the second processor to:
retrieve the second migration token from the remote storage location;
obtain the second platform-independent migration key from the memory of the first platform;
decrypt the second platform-independent migration key with the retrieved second migration token to obtain the second encryption key; and
decrypt the data stored on the second storage device using the second encryption key.

17. The system of claim 16, further comprising instructions that, in response to be executed by the first processor, causes the first processor to:
generate a device wrapping key; and
store the device wrapping key in the remote storage location,
wherein to encrypt the first and second encryption keys with the first and second migration tokens comprises to encrypt each of the first and second encryption keys using the device wrapping key and subsequently to encrypt the encrypted first and second encryption keys using the first and second migration tokens to generate each of the first and second platform-independent migration keys.

18. The system of claim 17, further comprising instructions that, in response to be executed by the second processor, causes the second processor to:

retrieve the device wrapping key from the remote storage location, and wherein to decrypt the first platform-independent migration key with the retrieved first migration token to obtain the first encryption key comprises to first decrypt the first platform-independent migration key with the retrieved first migration token to obtain the encrypted first encryption key; and decrypt the encrypted first encryption key with the retrieved device wrapping key to obtain the first encryption key.

19. The system, of claim 17, further comprising instructions that, in response to be executed by the second processor, causes the second processor to:

retrieve the device wrapping key from the remote storage location, and wherein to decrypt the second platform-independent migration key with the retrieved second migration token to obtain the second encryption key comprises to first decrypt the second platform-independent migration key with the retrieved second migration token to obtain the encrypted second encryption key; and decrypt the encrypted second encryption key with the retrieved device wrapping key to obtain the second encryption key.

20. The system of claim 12, further comprising instructions that, in response to be executed by the first processor, causes the first processor to:

determine a theft status of the first and second storage devices of the first platform; and deny access to the first platform in response to determining that the first platform has a theft status indicative of being lost or stolen.

* * * * *